(12) United States Patent
Kim et al.

(10) Patent No.: US 8,457,563 B2
(45) Date of Patent: Jun. 4, 2013

(54) APPARATUS AND METHOD FOR CALIBRATION FOR RELAY STATION IN MULTIPLE ANTENNA COMMUNICATION SYSTEM

(75) Inventors: Sung-Man Kim, Suwon-si (KR); Myung-Kwang Byun, Suwon-si (KR); Byung-Joon Park, Seoul (KR); Seong-Yong Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 885 days.

(21) Appl. No.: 12/565,296

(22) Filed: Sep. 23, 2009

(65) Prior Publication Data

US 2010/0075594 A1 Mar. 25, 2010

(30) Foreign Application Priority Data

Sep. 25, 2008 (KR) ........................ 10-2008-0094031

(51) Int. Cl.
*H04B 17/00* (2006.01)
(52) U.S. Cl.
USPC ................. 455/67.11; 455/67.13; 455/67.16; 455/115.1; 370/252

(58) Field of Classification Search
USPC .......... 455/67.11, 67.13, 67.16, 115.1, 115.2, 455/226.1, 226.3, 296, 121; 370/252, 280, 370/329
See application file for complete search history.

(56) References Cited

U.S. PATENT DOCUMENTS

| 7,680,461 | B2* | 3/2010 | Takano ........................ 455/69 |
| 8,193,971 | B2* | 6/2012 | Vook et al. .................. 342/174 |
| 2005/0095996 | A1* | 5/2005 | Takano ........................ 455/91 |
| 2005/0101264 | A1* | 5/2005 | Farlow et al. ................. 455/84 |
| 2010/0117890 | A1* | 5/2010 | Vook et al. .................. 342/174 |
| 2010/0142390 | A1* | 6/2010 | Sun et al. .................... 370/252 |
| 2010/0150013 | A1* | 6/2010 | Hara et al. ................... 370/252 |

\* cited by examiner

*Primary Examiner* — Minh D Dao
(74) *Attorney, Agent, or Firm* — Jefferson IP Law, LLP

(57) ABSTRACT

A calibration apparatus and method for supporting a Relay Station (RS) in a multiple antenna communication system are provided. The calibration method in the multiple antenna communication system which supports the RS includes, when a modem stage sends a downlink calibration signal, receiving, at a calibrator, the downlink calibration signal and estimating a downlink path channel, when the calibrator sends an uplink calibration signal, receiving, at the modem stage, the uplink calibration signal and estimating an uplink path channel, determining, at the modem stage, calibration coefficients per path not to generate a phase and amplitude difference with respect to the estimated uplink path channel and the estimated downlink path channel, and applying the calibration coefficients per path to corresponding antennas respectively.

28 Claims, 3 Drawing Sheets

APPARATUS AND METHOD FOR CALIBRATION FOR RELAY STATION IN MULTIPLE ANTENNA COMMUNICATION SYSTEM

PRIORITY

This application claims the benefit under 35 U.S.C. §119(a) of a Korean patent application filed in the Korean Intellectual Property Office on Sep. 25, 2008 and assigned Serial No. 10-2008-0094031, the entire disclosure of which is hereby incorporated by reference.

BACKGROUND OF THE INVENTION

1. Field of the Invention

The present invention relates generally to a multiple antenna system. More particularly, the present invention relates to a method and an apparatus for calibration in a multiple antenna system that supports a Relay Station (RS).

2. Description of the Related Art

System performance and capacity of mobile communication systems are limited by interference signals of the same channel between cells or within a cell, and radio channel characteristics such as multipath fading and the Doppler effect. To address the performance degradation factors, one technique for expanding the system capacity is a beamforming technique.

The beamforming technique directs a radio signal toward each terminal by multiplying downlink traffic transmitted to each terminal by a particular coefficient. To apply the beamforming technique to a Base Station (BS), it is necessary to calibrate a phase and amplitude difference caused by the characteristic difference of Radio Frequency (RF) elements of the downlink and the uplink of the BS.

A conventional calibration method relatively calibrates the phase and amplitude difference of the uplink per path. Likewise, the conventional calibration method relatively calibrates the phase and amplitude difference of the downlink per path. That is, the phase and the amplitude are calibrated equally per downlink and uplink based on Equation (1). Herein, four transmit antennas and four receive antennas are under consideration.

$$H_{d1}^* W_{d1} = H_{d2}^* W_{d2} = H_{d3}^* W_{d3} = H_{d4}^* W_{d4}$$

$$H_{u1}^* W_{u1} = H_{u2}^* W_{u2} = H_{u3}^* W_{u3} = H_{u4}^* W_{u4} \quad (1)$$

In Equation (1), the channel of the downlink path 1 is $H_{d1}$, the channel of the uplink path 1 is $H_{u1}$, the channel of the downlink path 2 is $H_{d2}$, the channel of the uplink path 2 is $H_{u2}$, the channel of the downlink path 3 is $H_{d3}$, the channel of the uplink path 3 is $H_{u3}$ the channel of the downlink path 4 is $H_{d4}$, and the channel of the uplink path 4 is $H_{u4}$. $W_{dx}$ denotes a beamforming calibration coefficient for the downlink path x and $W_{ux}$ denotes a calibration coefficient for the uplink path x.

The conventional method determines the calibration coefficients $W_{d1}$, $W_{d2}$, $W_{d3}$, $W_{d4}$, $W_{u1}$, $W_{u2}$, $W_{u3}$ and $W_{u4}$ to establish Equation (1). Moreover, the conventional method establishes the relationship of $H_{d1}/H_{u1}=H_{d2}/H_{u2}=H_{d3}/H_{u3}=H_{d4}/H_{u4}=\alpha$ (an unknown complex value including both the phase and the amplitude).

When the same unknown phase and amplitude difference α between the downlink and the uplink exists in each path, the beamforming coefficient is expressed by Equation (2).

$$w_t = \frac{\alpha h_t^*}{\sqrt{|h_1|^2 + |h_2|^2 + |h_3|^2 + |h_4|^2}}, t = 1, 2, 3, 4 \quad (2)$$

In Equation (2), $w_t$ denotes the t-th beamforming coefficient and $h_t$ denotes the t-th channel matrix, $h_t^*$ denotes the conjugate of $h_t$.

The receive signal beamformed based on Equation (2) is given by Equation (3).

$$r = \alpha \sqrt{|h_1|^2 + |h_2|^2 + |h_3|^2 + |h_4|^2} \cdot s + n \quad (3)$$

In Equation (3), α denotes a phase difference, s denotes a transmit vector, $h_t$ denotes the t-th channel matrix, and n denotes a noise vector.

To maximize a Signal to Noise Ratio (SNR) of the receive signal, a receiver of the terminal calibrates the phase of the receive signal. Accordingly, the value corresponding to the phase difference disappears from the value α, and merely the amplitude difference remains. In an ideal case, the SNR difference corresponds to the square of the amplitude difference and does not affect the beamforming performance.

The above-mentioned calibration method does not incur any problem in a BS that does not use a Relay Station (RS), but causes a problem in a system supporting an RS. The problem that occurs in a conventional system supporting an RS is now explained by referring to FIGS. 1A and 1B.

In FIG. 1A, when a Mobile Station (MS) 130 is far away from a BS 100, that is, when an RS 110 is propagationally isolated from the BS 100, such as being underground, on an "island", or in a shadow area, the beams 150 and 155 are formed in accordance with the sounding channel although the sounding is incoming via the RS 110. The beam corresponding to the interval between the RS 110 and the MS 130 is formed to the RS 110 and the BS 100 at the same time. However, since one radio resource is allocated to only one MS 130 in the region covering the BS 100 and the RS 110, there is no problem in the beamforming.

In FIG. 1B, when the MS 130, which is located between the BS 100 and the RS 110, simultaneously transmits sounding signals to the BS 100 and the RS 110, both of the uplink sounding signals 135 and 140 transmitted from the MS 130 are received at the BS 100 and the RS 110 and their combined signal is input to the BS 100. When a radio channel from the MS 130 to the BS 100 is h and a radio channel from the MS 130 to the RS 110 is h', the beamforming coefficient may be determined at the BS 100 using the current algorithm based on Equation (4).

$$w_t = \frac{(\alpha h_t + \beta h_t')^*}{\sqrt{|h_1 + h_1'|^2 + |h_2 + h_2'|^2 + |h_3 + h_3'|^2 + |h_4 + h_4'|^2}} \quad (4)$$

The signal received at the MS 130 is given by Equation (5).

$$r = \frac{\sum \{|h_t|^2 \alpha^* + |h_t'|^2 \beta^* + h_t^* h_t' \alpha^* + h_t h_t'^* \beta^*\}}{\sqrt{|h_1 + h_1'|^2 + |h_2 + h_2'|^2 + |h_3 + h_3'|^2 + |h_4 + h_4'|^2}} \cdot s + n \quad (5)$$

In Equation (5), α denotes the phase and amplitude difference of the downlink and the uplink at the BS, β denotes the phase and amplitude difference of the downlink and the uplink at the RS, $h_t$ denotes the t-th channel matrix, s denotes a transmit vector, and n denotes a noise vector.

In Equation (4) and Equation (5), when the MS between the RS and the BS transmits the sounding signals, the SNR differs depending on α and β. In other words, the beamforming performance is influenced by α and β.

As discussed above, since the phase and amplitude difference α of the downlink and the uplink of the BS 100 may differ from the phase and amplitude difference β of the downlink and the uplink of the RS 110, the multiple antenna system including the RS is subject to beamforming performance degradation.

SUMMARY OF THE INVENTION

An aspect of the present invention is to address at least the above mentioned problems and/or disadvantages and to provide at least the advantages described below. Accordingly, an aspect of the present invention is to provide an apparatus and a method for calibration to support a Relay Station (RS) in a multiple antenna communication system.

Another aspect of the present invention is to provide an apparatus and a method for beamforming in a multiple antenna communication system supporting an RS.

According to one aspect of the present invention, a calibration method in a multiple antenna communication system which supports an RS is provided. The method includes, when a modem stage sends a downlink calibration signal, receiving, at a calibrator, the downlink calibration signal and estimating a downlink path channel, when the calibrator sends an uplink calibration signal, receiving, at the modem stage, the uplink calibration signal and estimating an uplink path channel, determining, at the modem stage, calibration coefficients per path not to generate a phase and amplitude difference with respect to the estimated uplink path channel and the estimated downlink path channel, and applying the calibration coefficients per path to corresponding antennas respectively.

According to another aspect of the present invention, a calibration method in a multiple antenna communication system which supports an RS is provided. The method includes estimating, at a modem stage, a downlink path channel by transmitting and receiving a downlink calibration signal, switching, at a calibration controller, so that the modem stage transmits and receives one of an uplink calibration signal and the downlink calibration signal, estimating, at the modem stage, an uplink path channel by transmitting and receiving the uplink calibration signal, determining, at the modem stage, calibration coefficients per path not to generate a phase and amplitude difference with respect to the estimated uplink path channel and the estimated downlink path channel, and applying the calibration coefficients per path to corresponding antennas respectively.

According to yet another aspect of the present invention, a calibration method in a multiple antenna communication system which supports an RS is provided. The method includes, when a modem stage sends a downlink calibration signal, receiving, at a calibrator, the downlink calibration signal and estimating a downlink path channel, when the calibrator sends an uplink calibration signal, receiving, at the modem stage, the uplink calibration signal and estimating an uplink path channel, determining, at the modem stage, calibration coefficients per path to make a phase and amplitude difference with respect to the estimated uplink path channel and the estimated downlink path channel be a first value, and applying the calibration coefficients per path to corresponding antennas respectively.

According to still another aspect of the present invention, a calibration method in a multiple antenna communication system which supports an RS is provided. The method includes estimating, at a modem stage, a downlink path channel by transmitting and receiving a downlink calibration signal, switching, at a calibration controller, so that the modem stage transmits and receives one of an uplink calibration signal and the downlink calibration signal, estimating, at the modem stage, an uplink path channel by transmitting and receiving the uplink calibration signal, determining, at the modem stage, calibration coefficients per path to make a phase and amplitude difference with respect to the estimated uplink path channel and the estimated downlink path channel be a first value, and applying the calibration coefficients per path to corresponding antennas respectively.

According to a further aspect of the present invention, a calibration apparatus in a multiple antenna communication system which supports an RS is provided. The apparatus includes a modem stage for, when a downlink calibration signal is transmitted, receiving the downlink calibration signal from a calibrator and estimating a downlink path channel, and the calibrator for, when an uplink calibration signal is transmitted, receiving the uplink calibration signal from the modem stage and estimating an uplink path channel. In an exemplary implementation, the modem stage may determine calibration coefficients per path not to generate a phase and amplitude difference with respect to the estimated uplink path channel and the estimated downlink path channel, and apply the calibration coefficients per path to corresponding antennas respectively.

According to a further aspect of the present invention, a calibration apparatus in a multiple antenna communication system which supports a RS is provided. The apparatus includes a modem stage for estimating a downlink path channel by transmitting and receiving a downlink calibration signal, and a calibration controller for switching so that the modem stage transmits and receives one of an uplink calibration signal and the downlink calibration signal. In an exemplary implementation, the modem stage may estimate an uplink path channel by transmitting and receiving the uplink calibration signal, determine calibration coefficients per path not to generate a phase and amplitude difference with respect to the estimated uplink path channel and the estimated downlink path channel, and the apply the calibration coefficients per path to corresponding antennas respectively.

According to a further aspect of the present invention, a calibration apparatus in a multiple antenna communication system which supports an RS is provided. The apparatus includes a modem stage for, when a downlink calibration signal is transmitted, receiving the downlink calibration signal from a calibrator and estimating a downlink path channel, and the calibrator for, when an uplink calibration signal is transmitted, receiving the uplink calibration signal from the modem stage and estimating an uplink path channel. In an exemplary implementation, the modem stage may determine calibration coefficients per path to make a phase and amplitude difference with respect to the estimated uplink path channel and the estimated downlink path channel be a first value, and apply the calibration coefficients per path to corresponding antennas respectively.

According to a further aspect of the present invention, a calibration apparatus in a multiple antenna communication system which supports an RS is provided. The apparatus includes a modem stage for estimating a downlink path channel by transmitting and receiving a downlink calibration signal, and a calibration controller for switching so that the modem stage transmits and receives one of an uplink calibration signal and the downlink calibration signal. In an exemplary implementation, the modem stage may estimate an uplink path channel by transmitting and receiving the uplink calibration signal, determine calibration coefficients per path to make a phase and amplitude difference with respect to the estimated uplink path channel and the estimated downlink path channel be a first value, and apply the calibration coefficients per path to corresponding antennas respectively.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and an apparatus for calibration in a multiple antenna system based on a Relay Station (RS).

Figure 1A:
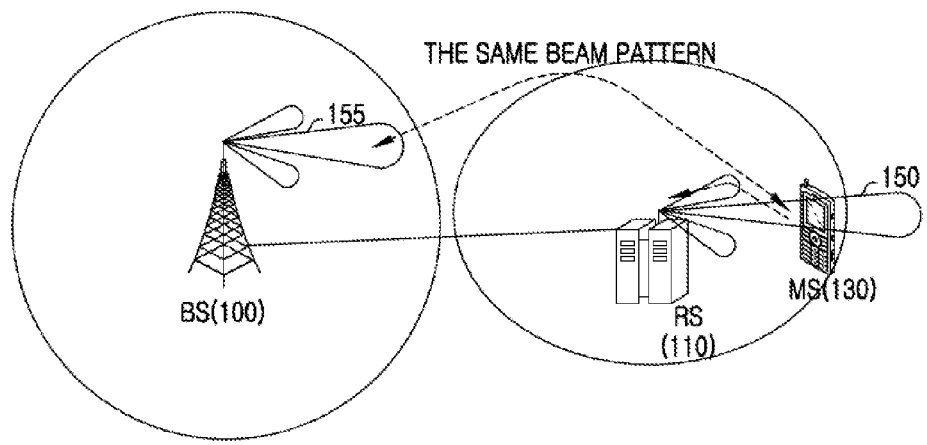
FIGS. 1A and 1B illustrate a diagram of a beamforming technique in a conventional multiple antenna system supporting a Relay Station (RS)
Figure 1B:
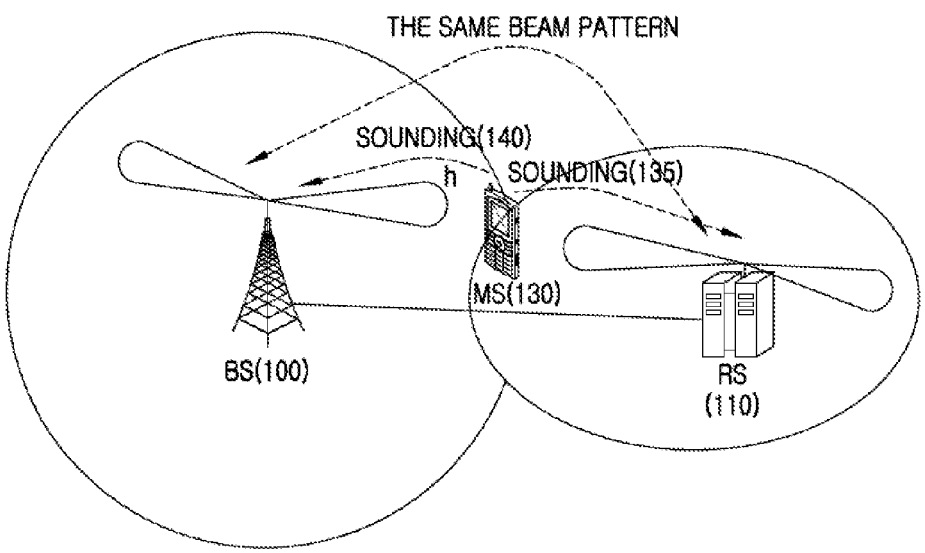
Figure 2:
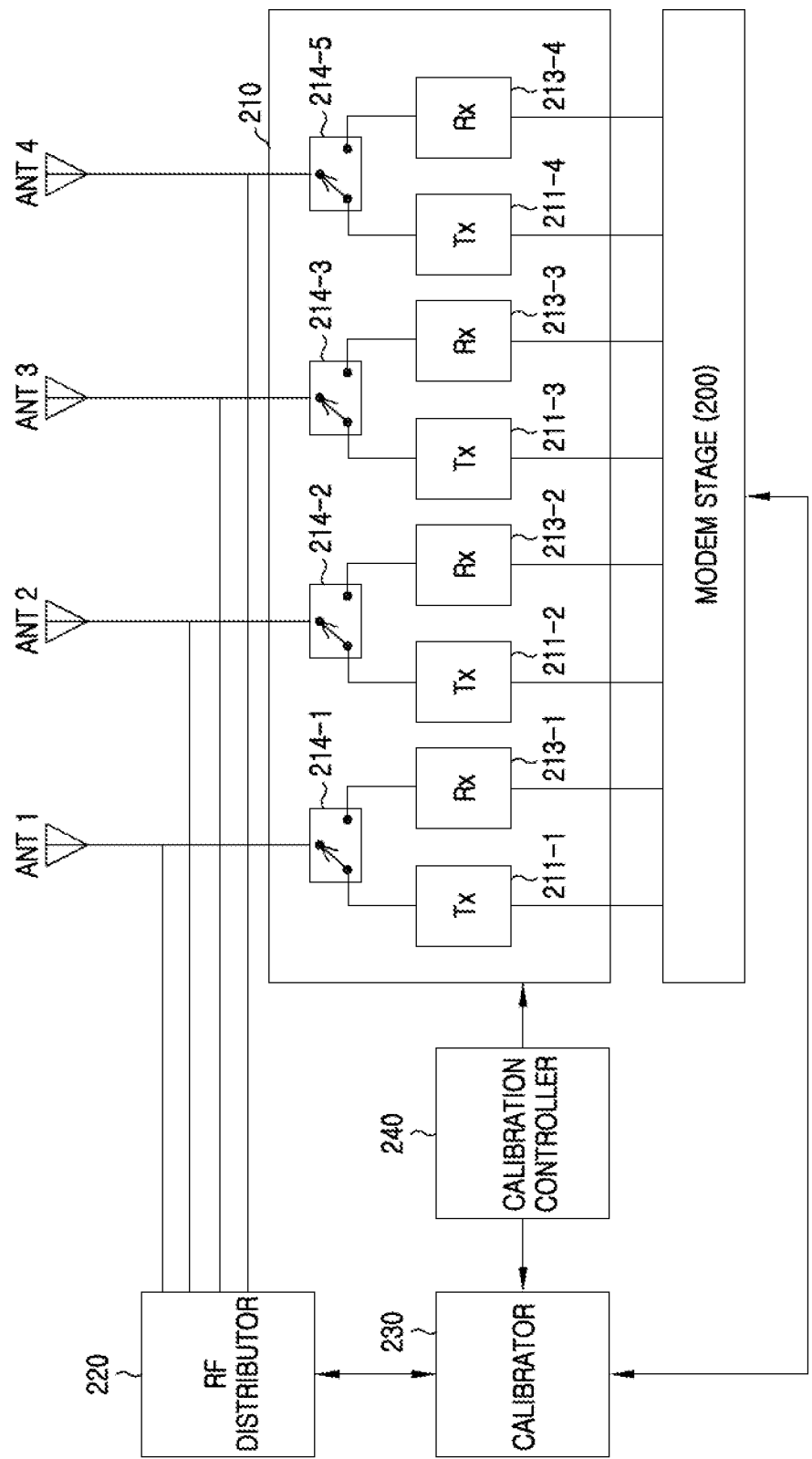
FIG. 2 illustrates a block diagram of a Base Station (BS) in a multiple antenna system supporting an RS according to an exemplary embodiment of the present invention.

FIG. 2 illustrates a block diagram of a Base Station (BS) in a multiple antenna system supporting an RS according to an exemplary embodiment of the present invention.

The BS of FIG. 2 includes a modem stage 200, a transceiver 210, a Radio Frequency (RF) distributor 220, a calibrator 230, and a calibration controller 240.

The modem stage 200 converts time-domain signals output from the transceiver 210 to frequency-domain signals using Fast Fourier Transform (FFT), selects data of subcarriers to actually receive from the frequency-domain data, and demodulates and decodes the selected data at a preset modulation level (i.e., Modulation and Coding Scheme (MCS) level). The modem stage 200 encodes and modulates a transmit signal at the preset modulation level (the MCS level) and converts the frequency-domain signal to a time-domain sample signal using Inverse FFT (IFFT). In addition, the modem stage 200 receives a calibration reference signal of the uplink from the transceiver 210 and estimates the uplink path channel. The modem stage 200 determines the calibration coefficients for the same value of the phase and amplitude difference of the uplink and the downlink using the downlink path channel estimate value provided from the calibrator 230 and its estimated uplink path channel estimate value (see Equation (6)). That is, the modem stage 200 equally calibrates the phase and amplitude difference per path of the downlink and the uplink.

$$H_{d1}*W_{d1}=H_{d2}*W_{d2}=H_{d3}*W_{d3}=H_{d4}*W_{d4}=H_{u1}*W_{u1}=H_{u2}*W_{u2}=H_{u3}*W_{u3}=H_{u4}*W_{u4} \quad (6)$$

In Equation (6), the downlink path channel of the path 1 between the antenna 1 and the RF distributor 220 is $H_{d1}$, the channel of the uplink path 1 is $H_{u1}$, the channel of the downlink path 2 between the antenna 2 and the RF distributor 220 is $H_{d2}$, the channel of the uplink path 2 is $H_{u2}$, the channel of the downlink path 3 between the antenna 3 and the RF distributor 220 is $H_{d3}$, the channel of the uplink path 3 is $H_{u3}$, the channel of the downlink path 4 between the antenna 4 and the RF distributor 220 is $H_{d4}$, and the channel of the uplink path 4 is $H_{u4}$.

Thus, the calibration coefficients $W_{d1}$, $W_{d2}$, $W_{d3}$, $W_{d4}$, $W_{u1}$, $W_{u2}$, $W_{u3}$ and $W_{u4}$ satisfying Equation (6) are acquired.

When the phase and amplitude difference in every downlink and uplink is equally calibrated as expressed in Equation (6), the beamforming coefficient is given by Equation (7).

$$w_t = \frac{(h_t + h'_t)^*}{\sqrt{|h_1 + h'_1|^2 + |h_2 + h'_2|^2 + |h_3 + h'_3|^2 + |h_4 + h'_4|^2}} \quad (7)$$

The receive signal is given by Equation (8).

$$r = \frac{\sum |h_t + h'_t|^2}{\sqrt{|h_1 + h'_1|^2 + |h_2 + h'_2|^2 + |h_3 + h'_3|^2 + |h_4 + h'_4|^2}} \cdot s + n \quad (8)$$

In Equation (8), α denotes the amplitude and phase difference of the downlink and the uplink at the BS, β denotes the amplitude and phase difference of the downlink and the uplink at the RS, $h_t$ denotes the t-th channel matrix between the t-th BS and the MS, $h_t'$ denotes the t-th channel matrix between the BS and the RS, s denotes a transmit vector, and n denotes a noise vector.

In reception, the transceiver 210 down-converts the RF signal received over the antennas to a baseband analog signal, converts the analog signal to a digital signal, and outputs the digital signal to the modem stage 200. In transmission, the transceiver 210 converts the sample signal to an analog signal, up-converts the baseband signal to an RF signal, and transmits the RF signal via the antennas. For transmission or reception by the transceiver 210, the BS operates in a Time Division Duplex (TDD) manner. For example, in transmission, switches 214-1 through 214-5 are switched to transmission blocks 211-1 through 211-4 to propagate data and control signals received from the modem stage 200 via the antennas. In reception, the switches 214-1 through 214-5 are switched to reception blocks 213-1 through 213-4 to output the receive signals to the modem stage 200.

In various implementations, the transmission blocks 211 and the reception blocks 213 may operate in a Frequency Division Duplex (FDD) manner.

The RF distributor 220 is interfaced with the multiple antennas. The RF distributor 220 receives the calibration reference signal of the downlink transmitted via the transceiver 210, distributes the receive signals per antenna, and sends the distributed signals to the calibrator 230. The RF distributor 220 outputs the calibration reference signal of the uplink to the transceiver 210.

The calibrator 230 estimates the downlink path channel by receiving the calibration reference signal of the downlink per antenna from the RF distributor 220 and outputs the estimated channel to the modem stage 200. Under the control of the calibration controller 240, the calibrator 230 outputs the calibration reference signal of the uplink to the RF distributor 220.

The calibration controller 240 determines the channel estimation time of the uplink and the channel estimation time of the downlink and controls the calibrator 230 and the transceiver 210. For example, in the uplink path channel estimation, the calibration controller 240 controls the calibrator 230 to output the calibration reference signal of the uplink and the transceiver 210 to receive the calibration reference signal of the uplink. In the downlink path channel estimation, the calibration controller 240 controls the transceiver 210 to output the calibration reference signal of the downlink output from the modem stage 200 over the antennas and controls the calibrator 230 to receive the calibration reference signal of the downlink.

In various exemplary embodiments, the modem stage 200 may function as the calibrator 230. For doing so, the calibration controller 240 can control the modem stage 200 to transmit and receive the downlink calibration signal and the uplink calibration signal respectively.

The present exemplary algorithm is applicable to a case where the additional calibrator 230 is not provided. In that case, the modem stage 200 executes the functions of the calibrator 230 through some switches.

Figure 3:
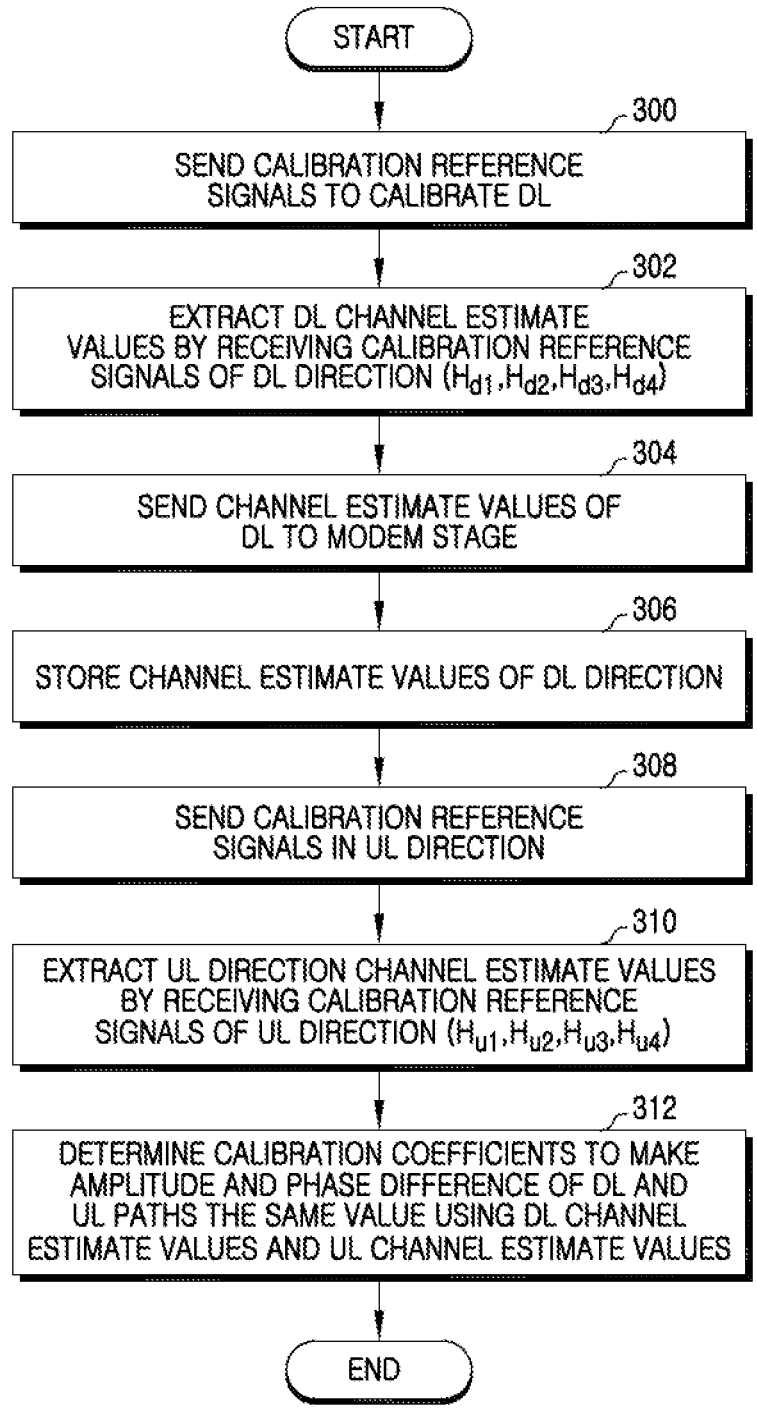
FIG. 3 illustrates a flowchart of calibration operations of a BS in a multiple antenna system supporting an RS according to an exemplary embodiment of the present invention.

FIG. 3 is a flowchart of a calibration method in a multiple antenna system supporting an RS according to an exemplary embodiment of the present invention.

In step 300, the modem stage 200 sequentially transmits the calibration reference signals per path to calibrate the downlink.

In step 302, the calibrator 230 receives the calibration reference signals of the downlink and determines the channel estimate values per downlink path.

In step 304, the calibrator 230 sends the determined channel estimate values of the downlink to the modem stage 200.

In step 306, the modem stage 200 stores the channel estimate values of the downlink received from the calibrator 230.

In step 308, the calibrator 230 sends the calibration reference signal to the modem stage 200 to calibrate the uplink.

In step 310, the modem stage 200 receives the calibration reference signal of the uplink and extracts the channel estimate values per uplink path.

In step 312, the modem stage 200 determines the calibration coefficients to make the phase and amplitude differences per path of the downlink and the uplink the same based on the channel estimate values of the downlink and the channel estimate values of the uplink (see Equation (6)).

In various exemplary embodiments, the calibration coefficient for the uplink path may be first determined and then the calibration coefficient for the downlink path may be determined by referring to the calibration coefficient for the uplink path. Alternatively, the calibration coefficient for the downlink path may be first determined and then the calibration coefficient for the uplink path may be determined by referring to the calibration coefficient for the downlink path.

Next, the present process is finished.

While the links are calibrated by estimating the downlink path channel and then the uplink path channel in FIG. 3, the links may be calibrated by estimating the uplink path channel and then the downlink path channel. The calibration order can be determined by the calibration controller 240.

As set forth above, in a multiple antenna system supporting an RS, the channels of the downlink and the uplink are estimated in order and the calibration coefficients are computed by comparing the estimated downlink path channel value and the estimated uplink path channel value. Therefore, the beamforming performance can be enhanced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A calibration method in a multiple antenna communication system which supports a Relay Station (RS), the method comprising:
    when a modem stage sends a downlink calibration signal, receiving, at a calibrator, the downlink calibration signal and estimating a downlink path channel;
    when the calibrator sends an uplink calibration signal, receiving, at the modem stage, the uplink calibration signal and estimating an uplink path channel;
    determining, at the modem stage, calibration coefficients per path not to generate a phase and amplitude difference with respect to the estimated uplink path channel and the estimated downlink path channel; and
    applying the calibration coefficients per path to corresponding antennas respectively.

2. The calibration method of claim 1, wherein the determining of the calibration coefficients per path comprises:
    determining a calibration coefficient with respect to a channel of a first path which is one of uplink path channels per path and downlink path channels per path; and
    determining the calibration coefficients per path to make all of the channels per path, excluding the channel of the first path, equal the channel of the first path which applies the calibration coefficient.

3. The calibration method of claim 1, wherein, when the calibration coefficients per path are applied to the corresponding antennas respectively and the number of the antennas is four, a beamforming coefficient is determined based on the following equation:

$$w_t = \frac{(h_t + h'_t)^*}{\sqrt{|h_1 + h'_1|^2 + |h_2 + h'_2|^2 + |h_3 + h'_3|^2 + |h_4 + h'_4|^2}}$$

where $w_t$ denotes a beamforming coefficient for a t-th path and $h_t$ denotes a channel matrix for the t-th path.

4. The calibration method of claim 1, wherein the calibration coefficients per path are determined in an environment where both of a Base Station (BS) and the RS receive sounding signals of a Mobile Station (MS).

5. A calibration method in a multiple antenna communication system which supports a Relay Station (RS), the method comprising:
    estimating, at a modem stage, a downlink path channel by transmitting and receiving a downlink calibration signal;
    switching, at a calibration controller, so that the modem stage transmits and receives one of an uplink calibration signal and the downlink calibration signal;

estimating, at the modem stage, an uplink path channel by transmitting and receiving the uplink calibration signal;

determining, at the modem stage, calibration coefficients per path not to generate a phase and amplitude difference with respect to the estimated uplink path channel and the estimated downlink path channel; and applying the calibration coefficients per path to corresponding antennas respectively.

6. The calibration method of claim 5, wherein the determining of the calibration coefficients per path comprises:

determining a calibration coefficient with respect to a channel of a first path which is one of uplink path channels per path and downlink path channels per path; and determining the calibration coefficients per path to make all of the channels per path, excluding the channel of the first path, equal the channel of the first path which applies the calibration coefficient.

7. The calibration method of claim 5, wherein, when the calibration coefficients per path are applied to the corresponding antennas respectively and the number of the antennas is four, a beamforming coefficient is determined based on the following equation:

$$w_t = \frac{(h_t + h'_t)^*}{\sqrt{|h_1 + h'_1|^2 + |h_2 + h'_2|^2 + |h_3 + h'_3|^2 + |h_4 + h'_4|^2}}$$

where $w_t$ denotes a beamforming coefficient for a t-th path and $h_t$ denotes a channel matrix for the t-th path.

8. The calibration method of claim 5, wherein the calibration coefficients per path are determined in an environment where both of a Base Station (BS) and the RS receive sounding signals of a Mobile Station (MS).

9. A calibration method in a multiple antenna communication system which supports a Relay Station (RS), the method comprising:

when a modem stage sends a downlink calibration signal, receiving, at a calibrator, the downlink calibration signal and estimating a downlink path channel;

when the calibrator sends an uplink calibration signal, receiving, at the modem stage, the uplink calibration signal and estimating an uplink path channel;

determining, at the modem stage, calibration coefficients per path to make a phase and amplitude difference with respect to the estimated uplink path channel and the estimated downlink path channel be a first value; and applying the calibration coefficients per path to corresponding antennas respectively.

10. The calibration method of claim 9, wherein the calibration coefficients per path are determined in an environment where both of a Base Station (BS) and the RS receive sounding signals of a Mobile Station (MS).

11. The calibration method of claim 9, wherein the first value is equally applied to a Base Station (BS) and the RS.

12. A calibration method in a multiple antenna communication system which supports a Relay Station (RS), the method comprising:

estimating, at a modem stage, a downlink path channel by transmitting and receiving a downlink calibration signal;

switching, at a calibration controller, so that the modem stage transmits and receives one of an uplink calibration signal and the downlink calibration signal;

estimating, at the modem stage, an uplink path channel by transmitting and receiving the uplink calibration signal;

determining, at the modem stage, calibration coefficients per path to make a phase and amplitude difference with respect to the estimated uplink path channel and the estimated downlink path channel be a first value; and applying the calibration coefficients per path to corresponding antennas respectively.

13. The calibration method of claim 12, wherein the calibration coefficients per path are determined in an environment where both of a Base Station (BS) and the RS receive sounding signals of a Mobile Station (MS).

14. The calibration method of claim 12, wherein the first value is equally applied to a Base Station (BS) and the RS.

15. A calibration apparatus in a multiple antenna communication system which supports a Relay Station (RS), the apparatus comprising:

a modem stage for, when a downlink calibration signal is transmitted, receiving the downlink calibration signal from a calibrator and estimating a downlink path channel; and the calibrator for, when an uplink calibration signal is transmitted, receiving the uplink calibration signal from the modem stage and estimating an uplink path channel, wherein the modem stage determines calibration coefficients per path not to generate a phase and amplitude difference with respect to the estimated uplink path channel and the estimated downlink path channel, and the modem stage applies the calibration coefficients per path to corresponding antennas respectively.

16. The calibration apparatus of claim 15, wherein the modem stage determines a calibration coefficient with respect to a channel of a first path which is one of uplink path channels per path and downlink path channels per path, and determines the calibration coefficients per path to make all of the channels per path, excluding the channel of the first path, equal the channel of the first path which applies the calibration coefficient.

17. The calibration apparatus of claim 15, wherein, when the calibration coefficients per path are applied to the corresponding antennas respectively and the number of the antennas is four, a beamforming coefficient is determined based on the following equation:

$$w_t = \frac{(h_t + h'_t)^*}{\sqrt{|h_1 + h'_1|^2 + |h_2 + h'_2|^2 + |h_3 + h'_3|^2 + |h_4 + h'_4|^2}}$$

where $w_t$ denotes a beamforming coefficient for a t-th path and $h_t$ denotes a channel matrix for the t-th path.

18. The calibration apparatus of claim 15, wherein the calibration coefficients per path are determined in an environment where both of a Base Station (BS) and the RS receive sounding signals of a Mobile Station (MS).

19. A calibration apparatus in a multiple antenna communication system which supports a Relay Station (RS), the apparatus comprising:

a modem stage for estimating a downlink path channel by transmitting and receiving a downlink calibration signal; and a calibration controller for switching so that the modem stage transmits and receives one of an uplink calibration signal and the downlink calibration signal, wherein the modem stage estimates an uplink path channel by transmitting and receiving the uplink calibration signal, the modem stage determines calibration coefficients per path not to generate a phase and amplitude difference with respect to the estimated uplink path channel and the estimated downlink path channel, and the modem stage applies the calibration coefficients per path to corresponding antennas respectively.

20. The calibration apparatus of claim 19, wherein the modem stage determines a calibration coefficient with respect to a channel of a first path which is one of uplink path channels per path and downlink path channels per path, and determines the calibration coefficients per path to make all of the channels per path excluding the channel of the first path, equal the channel of the first path which applies the calibration coefficient.

21. The calibration apparatus of claim 19, wherein, when the calibration coefficients per path are applied to the corresponding antennas respectively and a number of the antennas is four, a beamforming coefficient is determined based on the following equation:

$$w_t = \frac{(h_t + h'_t)^*}{\sqrt{|h_1 + h'_1|^2 + |h_2 + h'_2|^2 + |h_3 + h'_3|^2 + |h_4 + h'_4|^2}}$$

where $w_t$ denotes a beamforming coefficient for a t-th path and $h_t$ denotes a channel matrix for the t-th path.

22. The calibration apparatus of claim 19, wherein the calibration coefficients per path are determined in an environment where both of a Base Station (BS) and the RS receive sounding signals of a Mobile Station (MS).

23. A calibration apparatus in a multiple antenna communication system which supports a Relay Station (RS), the apparatus comprising:

a modem stage for, when a downlink calibration signal is transmitted, receiving the downlink calibration signal from a calibrator and estimating a downlink path channel; and the calibrator for, when an uplink calibration signal is transmitted, receiving the uplink calibration signal from the modem stage and estimating an uplink path channel, wherein the modem stage determines calibration coefficients per path to make a phase and amplitude difference with respect to the estimated uplink path channel and the estimated downlink path channel be a first value, and applies the calibration coefficients per path to corresponding antennas respectively.

24. The calibration apparatus of claim 23, wherein the calibration coefficients per path are determined in an environment where both of a Base Station (BS) and the RS receive sounding signals of a Mobile Station (MS).

25. The calibration apparatus of claim 23, wherein the first value is equally applied to a Base Station (BS) and the RS.

26. A calibration apparatus in a multiple antenna communication system which supports a Relay Station (RS), the apparatus comprising:

a modem stage for estimating a downlink path channel by transmitting and receiving a downlink calibration signal; and a calibration controller for switching so that the modem stage transmits and receives one of an uplink calibration signal and the downlink calibration signal, wherein the modem stage estimates an uplink path channel by transmitting and receiving the uplink calibration signal, the modem stage determines calibration coefficients per path to make a phase and amplitude difference with respect to the estimated uplink path channel and the estimated downlink path channel be a first value, and the modem stage applies the calibration coefficients per path to corresponding antennas respectively.

27. The calibration apparatus of claim 26, wherein the calibration coefficients per path are determined in an environment where both of a Base Station (BS) and the RS receive sounding signals of a Mobile Station (MS).

28. The calibration apparatus of claim 26, wherein the first value is equally applied to a BS and the RS.

* * * * *